United States Patent [19]

Gansen et al.

[11] Patent Number: 4,945,117
[45] Date of Patent: Jul. 31, 1990

[54] LIQUID POLYISOCYANATE COMPOSITIONS, A PROCESS FOR THEIR PREPARATION, AND THEIR USE FOR THE PREPARATION OF FLEXIBLE POLYURETHANE FOAMS

[75] Inventors: Peter Gansen; Klaus-Dieter Wolf; Klaus Seel, all of Cologne, Fed. Rep. of Germany

[73] Assignee: Bayer Aktiengesellschaft, Bayerwerk, Fed. Rep. of Germany

[21] Appl. No.: 354,649

[22] Filed: May 19, 1989

[30] Foreign Application Priority Data

Jun. 2, 1988 [DE] Fed. Rep. of Germany ....... 3818769

[51] Int. Cl.$^5$ ............................................. C08G 18/14
[52] U.S. Cl. ...................................... 521/99; 521/159; 528/67; 528/77; 560/25; 560/158
[58] Field of Search ................... 521/99, 159; 528/67, 528/77; 560/25, 158

[56] References Cited

U.S. PATENT DOCUMENTS

| | | | |
|---|---|---|---|
| 3,644,457 | 2/1972 | König et al. | 260/453 |
| 4,055,548 | 10/1977 | Carleton et al. | 260/77.5 |
| 4,229,347 | 10/1980 | Holt et al. | 260/239 |
| 4,261,852 | 4/1981 | Carroll et al. | 528/59 |
| 4,478,960 | 10/1984 | Buethe et al. | 521/160 |

FOREIGN PATENT DOCUMENTS

| | | |
|---|---|---|
| 0022617 | 1/1981 | Fed. Rep. of Germany . |
| 1369334 | 10/1974 | United Kingdom . |
| 1377676 | 12/1974 | United Kingdom . |
| 1430455 | 3/1976 | United Kingdom . |
| 1444192 | 7/1976 | United Kingdom . |
| 1450660 | 9/1976 | United Kingdom . |
| 1550325 | 8/1979 | United Kingdom . |

*Primary Examiner*—Maurice J. Welsh
*Attorney, Agent, or Firm*—Joseph C. Gil; Richard E. L. Henderson

[57] ABSTRACT

This invention relates to liquid urethane-modified polyisocyanate compositions obtained by reaction of polyisocyanates or polyisocyanate mixtures of the diphenylmethane series containing from about 50 to about 100% by weight diisocyanatodiphenylmethane isomers with substoichiometric quantities of polyether polyol compositions having an average hydroxyl equivalent weight of about 500 to 3000 and an average hydroxyl functionality greater than about 4, optionally followed by mixing the initially formed reaction product with urethane-free polyisocyanates or polyisocyanate mixtures of the diphenylmethane series containing from about 40 to about 100% by weight diisocyanatodiphenylmethane isomers. This invention also relates to a process for the preparation of such polyisocyanate compositions. The invention further relates to the use of such compositions as the polyisocyanate component in the production of flexible polyurethane foams.

26 Claims, No Drawings

LIQUID POLYISOCYANATE COMPOSITIONS, A PROCESS FOR THEIR PREPARATION, AND THEIR USE FOR THE PREPARATION OF FLEXIBLE POLYURETHANE FOAMS

BACKGROUND OF THE INVENTION

The present invention relates to novel liquid urethane polyisocyanate compositions based on polyisocyanates or polyisocyanate mixtures of the diphenylmethane series and on certain polyether polyols of relatively high functionality. The present invention also relates to a process for the preparation of such polyisocyanate compositions. The invention further relates to the use of such compositions as the polyisocyanate component in the production of flexible polyurethane foams, particularly molded flexible polyurethane foams.

It is known that 4,4'-diisocyanatodiphenylmethane or polyisocyanate mixtures of the diphenylmethane series containing 4,4'-diisocyanatodiphenylmethane as their principal component can be modified with substoichiometric quantities of polyether polyols in such a way that the resultant isocyanate semiprepolymers show a reduced tendency for solid 4,4'-diisocyanatodiphenylmethane to separate. Such modified materials are liquids that are stable at room temperature and even lower temperatures. See, for example, DE-PS 1,618,380, GB 1,369,334, DE-OS 2,913,126, DE-OS 2,404,166, DE-OS 2,346,996, DE-AS 2,737,338, DE-AS 2,624,526, DE-OS 2,513,793, DE-OS 2,513,796, EP-A 010,850, EP-A 022,617 or EP-A 111,121. Among the polyisocyanate compositions that are increasingly being used for the production of flexible polyurethane foams, especially cold-hardening molded flexible polyurethane foams, are certain isocyanate semiprepolymers, by which are meant mixtures of excess starting polyisocyanate with urethane-modified starting polyisocyanate. In particular, such isocyanate semiprepolymers include those based on polyisocyanates or polyisocyanate mixtures of the diphenylmethane series and on relatively high molecular weight polyether polyols of the type described, for example, in EP-A 010,850 or EP-A 111,121. Applications for foams of this type include, for example, upholstery materials used in vehicles or for furniture and carpet backings.

It has now been found that isocyanate semiprepolymers based on polyisocyanates or polyisocyanate mixtures of the diphenylmethane series and on polyether components consisting of at least one polyether polyol having a hydroxyl equivalent weight of about 500 to about 3000 and a hydroxyl functionality of greater than about 4 are room-temperature liquids that are valuable starting materials for the production of flexible polyurethane foams. The polyisocyanate mixtures of the present invention, which are described in more detail below, have the following advantages:

1. It is possible to produce flexible foams having a comparatively low gross density but having the same favorable mechanical properties.

2. The isocyanate index range is broad and, hence, the potential hardness range for the same polyol component is also broad. In other words, typical flexible molded foam formulations may readily be processed within the isocyanate index range of 80 to 120 using the polyisocyanate mixtures of the invention.

3. The polyisocyanate mixtures of the invention allow the preparation of flexible foams using large quantities of water as blowing agent. That is, up to 6% by weight based on the polyol component can be used. Such quantities are atypical of MDI-based flexible foams. As a result, molded foams having gross densities below 40 kg/m$^3$ may be obtained without using physical blowing agents.

4. The mechanical properties of the foams, particularly their tensile strength and elongation at break, are excellent. This is surprising because the use of relatively high molecular weight polyether polyols having a hydroxyl functionality above 3 (particularly above 4) as part of the polyol component that is reacted with the polyisocyanate component is completely atypical for the preparation of flexible polyurethane foams. In general, the use of such polyols actually leads to a reduction in tensile strength.

SUMMARY OF THE INVENTION

The present invention relates to urethane-modified polyisocyanate compositions having an NCO content of 15 to 30% by weight that are liquid at room temperature, wherein said polyisocyanate mixtures are obtained by reaction of (a1) polyisocyanates or polyisocyanate mixtures of the diphenylmethane series containing from about 50 to about 100% by weight diisocyanatodiphenylmethane isomers, with (b) substoichiometric quantities of a polyether polyol composition, said composition being (i) a polyether polyol having a hydroxyl equivalent weight of about 500 to about 3000 and a hydroxyl functionality greater than about 4 or (ii) a mixture of two or more polyether polyols having an average hydroxyl equivalent weight of about 500 to about 3000 and an average hydroxyl functionality greater than about 4, optionally followed by mixing the reaction product obtained by reaction of components (a1) and (b) with (a2) urethane-free polyisocyanates or polyisocyanate mixtures of the diphenylmethane series containing from about 40 to about 100% by weight diisocyanatodiphenylmethane isomers, with the proviso that when optional component (a2) is used, the total content of diisocyanatodiphenylmethane isomers in components (a1) and (a2) is from about 50 to about 95% by weight of the combined amounts of components (a1) and (a2) and the total content of polyisocyanates of the diphenylmethane series having functionality greater than 2 in components (a1) and (a2) is from about 5 to about 50% by weight of the combined amounts of components (a1) and (a2).

The present invention also relates to a process for the preparation of such polyisocyanate compositions comprising reacting (a1) polyisocyanates or polyisocyanate mixtures of the diphenylmethane series containing from about 50 to about 100% by weight diisocyanatodiphenylmethane isomers, with (b) substoichiometric quantities of a polyether polyol composition, said composition being (i) a polyether polyol having a hydroxyl equivalent weight of about 500 to about 3000 and a hydroxyl functionality greater than about 4 or (ii) a mixture of two or more polyether polyols having an average hydroxyl equivalent weight of about 500 to about 3000 and an average hydroxyl functionality greater than about 4,
optionally followed by mixing the reaction product obtained by reacting components (a1) with (b) with
(a2) a urethane-free polyisocyanate or polyisocyanate mixture of the diphenylmethane series containing from about 40 to about 100% by weight diisocyanatodiphenylmethane isomers,
with the proviso that when optional component (a2) is used, the total content of diisocyanatodiphenylmethane isomers in components (a1) and (a2) is from about 50 to about 95% by weight of the combined amounts of components (a1) and (a2) and the total content of polyisocyanates of the diphenylmethane series having functionality greater than 2 in components (a1) and (a2) is from about 5 to about 50% by weight of the combined amounts of components (a1) and (a2).

The present invention further relates to the use of such polyisocyanate compositions as polyisocyanate component in the production of flexible polyurethane foams.

DETAILED DESCRIPTION OF THE INVENTION

The term "polyisocyanate of the diphenylmethane series" refers generically to any of the diisocyanates and polyisocyanates which are formed in the phosgenation of anilineformaldehyde condensates and are present as components in the phosgenation product mixture. The term "polyisocyanate mixture of the diphenylmethane series" embraces mixtures of "polyisocyanates of the diphenylmethane series." That is, "polyisocyanate mixtures of the diphenylmethane series" includes the above-mentioned phosgenation products of aniline-formaldehyde condensates; mixtures formed by mixing individual "polyisocyanates of the diphenylmethane series" and/or different mixtures thereof; and mixtures of "polyisocyanates of the diphenylmethane series" of the type obtained as distillate or distillation residue in the partial distillation of phosgenation products of aniline-formaldehyde condensates.

In the practical application of the process according to the invention, the polyisocyanate component (a1) is reacted with the polyether polyol component (b) at a temperature in the range of about 0° to about 100° C. (preferably at a temperature in the range of about 20° to about 80° C.), such that the quantitative ratio of components (a1) and (b) corresponds to an NCO/OH equivalent ratio of 1:0.002 to 1:0.2 (preferably 1:0.003 to 1:0.03). The reaction product thus obtained is optionally then mixed with the polyisocyanate component (a2). The reaction time between components (a1) and (b) is generally between 0.5 and 12 hours, preferably between 1 and 4 hours.

Suitable components (a1) are, in principle, any polyisocyanates or polyisocyanate mixtures of the diphenylmethane series containing a least 50% by weight of diisocyanatodiphenylmethane isomers. Particularly suitable starting components (a1) are polyisocyanate mixtures of the diphenylmethane series which contain from about 60 to about 95% by weight (preferably from about 70 to about 90% by weight) of diisocyanatodiphenylmethane isomers, with the remaining constituents being relatively high functionality polyisocyanates of the diphenylmethane series or even diisocyanatodiphenylmethane isomers or isomer mixtures containing no relatively high functionality polyisocyanates. Accordingly, component (a1) may contain, for example, pure 4,4'-diisocyanatodiphenylmethane; mixtures of 4,4'-diisocyanatodiphenylmethane with up to 50% by weight (preferably from 10 to 40% by weight), based on the total polyisocyanate mixture, of 2,4'-diisocyanatodiphenylmethane and, optionally, up to 5% by weight, based on the total polyisocyanate mixture, of 2,2'-diisocyanatodiphenylmethane; or even polyisocyanate mixtures of the diphenylmethane series which, in addition to these diisocyanates, contain up to 50% by weight (preferably up to 40% by weight), based on the mixture as a whole, of relatively high functionality polyisocyanates of the diphenylmethane series. Particularly preferred components (a1) consist of diisocyanate mixtures having the aforementioned isomer distribution or mixtures containing relatively high functionality polyisocyanates in which the diisocyanate component corresponds to the aforementioned isomer distribution. Polyisocyanate mixtures having an increased content of 2,4'-diisocyanatodiphenylmethane may be obtained, for example, by phosgenation of the corresponding polyamine mixtures, which, in turn, may be obtained directly by aniline-formaldehyde condensation in accordance with DE-OS 3,407,494. If desired, the content of 2,4'-diisocyanatodiphenylmethane in the diisocyanate or polyisocyanate mixtures may also be increased by mixing with distillation fractions enriched with 2,4'-diisocyanatodiphenylmethane of the type obtainable in the partial distillation of phosgenation products of aniline-formaldehyde condensates.

Suitable polyether polyol compositions of component (b) contain at least one polyether polyol. When one polyether polyol is used, the hydroxyl equivalent weight is about 500 to about 3000 and the hydroxyl functionality is greater than about 4. When a polyether polyol mixture is used, the average hydroxyl equivalent weight of the mixture as a whole is also from about 500 to about 3000 and its average functionality is likewise greater than about 4. The term "polyether polyol" is intended to embrace polyether polyols which are formed during alkoxylation of a single starting material and, hence, can actually represent mixtures of various degrees of acetylation. Thus, for the purposes of this invention, one polyether polyol gives rise to "one" alkoxylation product. The term "polyether polyol mixture" can in turn represent mixtures of different such alkoxylation products. Preferred polyol compositions of component (b) include polyether polyols having a hydroxyl equivalent weight of about 800 to about 2500 and a hydroxyl functionality of about 4.5 to about 6 or polyether polyol mixtures having an average hydroxyl equivalent weight of about 800 to about 2500 and an average hydroxyl functionality of about 4.5 to about 6. Other suitable polyether polyols used for component (b) include those in which about 70 to about 100% by weight of the polyether chains consist of polymerized propylene oxide units and the rest of the polyether chains are polymerized ethylene oxide units, which may be arranged in statistical distribution, in the form of polyethylene oxide blocks within the chains, and/or terminally. Particularly preferred polyether polyols of this type include those which contain up to about 30% by weight (especially from 5 to 25% by weight), based on the total quantity of alkylene oxide units present, of exclusively terminal polymerized ethylene oxide units. Such polyether polyols can be obtained using known methods by propoxylation of suitable starting materials and subsequent ethoxylation of the propoxylation products. Suitable polyether polyols may be obtained using known methods by alkoxylating suitable starting materials in the presence of basic catalysts, with propylene oxide and, optionally, ethylene oxide being used as the alkylene oxides used as described above. Suitable starting materials for preparing such polyether polyols include any low molecular weight compounds or mixtures of compounds which, on a statistical average, are selected according to their OH or NH functionality in such a way as to give polyether polyols having the appropriate hydroxyl functionality. Examples of suitable polyol starting materials include alcohols of higher than tetrafunctionality, such as sorbitol, sorbose, and cane sugar, and mixtures of such alcohols with other polyhydric low molecular weight alcohols, such as propylene glycol, trimethylolpropane, glycerol, and pentaerythritol, or even with water. The average functionality of the mixture of the starting materials must, however, always satisfy the above-mentioned requirements for hydroxyl functionality. Other suitable, although less preferred, polyol starting materials or mixing components for the preparation of the polyol starting mixtures include low molecular weight compounds containing at least two NH groups, such as ethylenediamine, diethylenetriamine, and 2,4-diaminotoluene.

In the preparation of the reaction products of components (a1) and (b), the two components are allowed to react together in accordance with the foregoing observations regarding quantitative ratios and reaction temperature, with the polyisocyanate component being introduced first and the polyol component being added to the polyisocyanate.

Suitable optional polyisocyanate components (a2) include essentially the same polyisocyanates or polyisocyanate mixtures of the diphenylmethane series of the type described above for component (a1), although components (a1) and (a2) need not, of course, have the same composition. In addition to the polyisocyanates or polyisocyanate mixtures already mentioned for component (a1), however, component (a2) may in certain cases also include polyisocyanate mixtures of the diphenylmethane series containing up to about 60% by weight of polyisocyanates of functionality greater than 2. However, such polyisocyanate mixtures are less preferred. Polyisocyanate mixtures of the diphenylmethane series which contain from about 50 to about 80% by weight (especially from about 50 to about 70% by weight) of diisocyanatodiphenylmethane isomers and, for the rest, relatively high functionality polyisocyanates of the diphenylmethane series are preferably use as the optional component (a2). Although possible in principle, the use of exclusively difunctional diisocyanates or diisocyanate mixtures as component (a2) is less preferred. Other preferred compositions for component (a2) include polyisocyanate mixtures of the diphenylmethane series in which the composition of the diisocyanatodiphenylmethane isomers diisocyanatodiphenylmethane isomers is about 60 to about 90% by weight 4,4'-diisocyanato diphenylmethane, about 10 to about 40% by weight 2,4'-diiso- cyanatodiphenylmethane, and about 0 to about 5% by weight 2,2'-diisocyanatodiphenylmethane (with the percentages adding up to 100%).

In addition, the type of and quantitative ratios between the starting components (a1) and (b), as well as optional (a2), are preferably selected in accordance with the foregoing observations in such a way that the polyisocyanate mixtures according to the invention have an NCO content of about 15 to about 30% by weight (preferably 20 to 28% by weight), with the starting components (a1) and (a2) having a total content of about 50 to about 95% by weight diisocyanatodiphenylmethane isomers and a total content of about 5 to about 50% by weight polyisocyanates of the diphenylmethane series having higher than difunctionality (with the percentages adding up to 100%). The diisocyanates in such compositions contain about 60 to about 90% by weight (preferably 65 to 85% by weight) 4,4'-diisocyanatodiphenylmethane, about 10 to about 40% by weight (preferably 15 to 35% by weight) 2,4'-diisocyanatodiphenylmethane, and about 0 to about 5% by weight of 2,2'-diisocyanatodiphenylmethane (with the percentages also adding up to 100%).

When the polyisocyanate compositions of the invention are used for the production of flexible polyurethane foams, they are reacted in known manner with a suitable polyol component at an isocyanate index below about 130, preferably from about 80 to about 120. The term "isocyanate index" refers to the quotient determined by dividing the number of isocyanate groups present in the reaction mixture by the number of hydroxyl groups present in the reaction mixture and multiplied by 100. The term "polyol component" refers to a mixture of the isocyanate-reactive compounds and the auxiliaries and additives used in preparing the foams. More particularly, the polyol component used to prepare the foams may include the following constituents:

1. Compounds containing at least two isocyanate-reactive hydrogen atoms and having a molecular weight generally ranging from about 400 to about 10,000. Preferred compounds of this type are those containing hydroxyl groups, more especially 2 to 6 and preferably 2 to 4 hydroxyl groups, particularly those having a molecular weight in the range of about 1000 to about 6000 (preferably from 3000 to 6000). Preferred compounds of this type include polyethers or polyesters, more especially polyethers, containing 2 to 6 and preferably 2 to 4 hydroxyl groups of the type known for the production of homogeneous and cellular polyurethanes and described, for example, in DE-OS 2,832,253, pages 11 et seq. Preferred compounds have an OH value of about 28 to about 56.

2. Optionally, compounds containing at least 2 isocyanate reactive hydrogen atoms and having a molecular weight of from about 62 to about 399. Preferred compounds of this type are those containing hydroxyl groups which serve as crosslinking agents or chain-extending agents. These compounds generally contain 2 to 4 isocyanate-reactive hydrogen atoms. Examples of such compounds can be found in DE-OS 2,832,253, pages 10 et seq.

3. Water as blowing agent in a quantity of about 1 to about 6 parts by weight per 100 parts by weight of polyol component 1.

4. Optional auxiliaries and additives, such as
  (a) readily volatile organic substances as further blowing agents,
  (b) known reaction accelerators and reaction retarders used in the usual quantities,
  (c) surface-active additives, such as emulsifiers and foam stabilizers; known cell regulators, such as paraffins, fatty alcohols, and dimethyl polysiloxanes; pigments or dyes; known flameproofing agents, such as trischloroethyl phosphate and tricresyl phosphate; stabilizers against the effects of aging and weather; plasticizers; fungistatic and bacteriostatic agents; and fillers, such as barium sulfate, kieselguhr, carbon black, and whiting.

These optional auxiliaries and additives are described, for example, in DE-OS 2,732,292, pages 21 et seq. Other examples of surface-active additives and foam stabilizers, cell regulators, reaction retarders, stabilizers, flameproofing agents, plasticizers, dyes, fillers, and fungistatic and bacteriostatic agents which may optionally be used in accordance with the invention, as well as information on the use and mode of action of these additives, can be found in Kunststoff-Handbuch, Vol. VII, published by Vieweg and Höchtlen, Carl-Hanser-Verlag, Munich 1966, for example, on pages 103 to 113.

The reaction components are preferably reacted by the known one-shot process, often using machines, for example, of the type described in U.S. Pat. No. 2,764,565. Information on processing machines that may also be used in accordance with the invention can be found in Kunststoff-Handbuch, Vol. VII, published by Vieweg and Höchtlen, Carl-Hanser-Verlag, Munich 1966, for example, on pages 121 to 205.

The foaming reaction performed according to the invention is preferably carried out in closed molds into which the reaction mixture is introduced. Suitable mold materials include metals, such as aluminum, and plastics, such as epoxy resins. The reaction mixture foams in the mold, thereby forming the molding. It is possible to introduce foamable reaction mixture into the mold in such a quantity that the foam formed just fills the mold. However, it is also possible to introduce more foamable reaction mixture into the mold than is necessary to fill the interior of the mold with foam, a technique known as overcharging and described, for example, in U.S. Pat. Nos. 3,178,490 and 3,182,104.

The following examples further illustrate details for the processes and compositions of this invention. The invention, which is set forth in the foregoing disclosure, is not to be limited either in spirit or scope by these examples. Those skilled in the art will readily understand that known variations of the conditions and processes of the following preparative procedures can be used. Unless otherwise noted, all temperatures are degrees Celsius and all percentages are percentages by weight. The abbreviation "MDI" stands for "diisocyanatodiphenylmethane". The abbreviation "polymeric MDI" stands for polyisocyanates of the diphenylmethane series having an NCO functionality greater than 2. The abbreviation "crude MDI" stands for a crude, undistilled polyisocyanate mixture of the diphenylmethane series of the type obtained by phosgenation of aniline-formaldehyde condensate.

DESCRIPTION OF THE PREFERRED EMBODIMENTS

EXAMPLE 1

Preparation of the MDI semiprepolymer 20.0 parts by weight of a polyether polyol (OH value 28) prepared by propoxylation of sorbitol and subsequent ethoxylation of the propoxylation product (ethylene oxide content 13%) are introduced with stirring at 60°-80° C. into crude MDI (NCO content 32.5%) having the following composition:

| | |
|---|---|
| 47.5 parts by weight | 4,4'-MDI |
| 18.4 parts by weight | 2,4'-MDI |
| 2.1 parts by weight | 2,2'-MDI |
| 12.0 parts by weight | polymeric MDI |

After a reaction time of about 3 hours at approximately 70° C., the reaction mixture is left to cool.

The analytically determined NCO content is 25.3%. The polyisocyanate mixture shows no sedimentation after storage for several months at 0° C.

COMPARISON EXAMPLE I 20.0 parts by weight of a polyether polyol (OH value 28) prepared by propoxylation of trimethylolpropane and subsequent ethoxylation of the propoxylation product (ethylene oxide content 13%) are introduced with stirring at 60°-80° C. into the crude MDI of Example 1. After a reaction time of about 3 hours at approximately 70° C., the reaction mixture is left to cool.

A polyisocyanate mixture having an NCO content of 25.3% is formed.

EXAMPLE 2

Preparation of a flexible polyurethane foam A component:

| | |
|---|---|
| 100 parts by weight | polyether polyol (OH value 28) used in Example 1 |
| 3.4 parts by weight | water |
| 1.0 part by weight | a commercial amine catalyst (Dabco XED 20, a product of Air Products) |
| 1.0 part by weight | N-methyl-N,N-dicyclohexylamine |
| 0.3 part by weight | triethylamine |
| 0.6 part by weight | a commercial crosslinking agent based on aliphatic polyamines (PU-Vernetzer 56, a product of Bayer AG) |
| 0.5 part by weight | a commercial polyether polysiloxane stabilizer (B 5246, a product of Goldschmidt AG) |
| 2.0 parts by weight | a polyether polyol (OH value 36) prepared by propoxylation of glycerol and subsequent ethoxylation of the propoxylation product and containing 73% polymerized oxyethylene groups |

B component:

Semiprepolymer of Example 1

100 parts by weight of the A component are mixed in a high-pressure machine with 69 parts by weight of the B component (NCO index 100).

The reaction mixture is introduced into a 40-liter box mold preheated to about 25° C. and the mold is closed. After about 6 minutes the molding is removed from the mold. The shot weight (2.03 kg) is experimentally determined. Mechanical testing of the molding gives the following results:

| Test results: | | |
|---|---|---|
| Gross density (kg/m³) | DIN 53,420 | 45.2 |
| Compression hardness 40% (kPa) | DIN 53,577 | 2.82 |
| Tensile strength (kPa) | DIN 53,571 | 152 |
| Elongation at break (%) | DIN 53,571 | 132 |
| Compression set 50%, Ct value (%) | DIN 53 572 | 7.1 |

COMPARISON EXAMPLE II

Preparation of a flexible polyurethane foam

A component:

A component of Example 2

B component:

Polyisocyanate mixture of Comparison Example I

The processing parameters are as in Example 2, except that a higher shot weight (2.22 kg) is necessary to completely fill the mold with the foam formed. Mechanical testing of a foam specimen gives the following results:

| Test results: | | |
|---|---|---|
| Gross density (kg/m³) | DIN 53,420 | 49.3 |
| Compression hardness 40% (kPa) | DIN 53,577 | 2.83 |
| Tensile strength (kPa) | DIN 53,571 | 139 |
| Elongation at break (%) | DIN 53,571 | 139 |
| Compression set 50%, Ct value (%) | DIN 53,572 | 6.7 |

Comparison of the foam properties of Example 2 with those of Comparison Example II shows that, despite the reduction in gross density of 9% in Example 2, the mechanical properties are at least as good as those obtained in Comparison Example II.

EXAMPLE 3

Preparation of flexible polyurethane foam A component:

| | |
|---|---|
| 100 parts by weight | polyether polyol (OH value 28) of Example 1 |
| 5.5 parts by weight | water |
| 1.0 part by weight | methyl dicyclohexylamine |
| 0.2 part by weight | triethylamine |
| 0.4 part by weight | 33% solution of diazabicyclo[2.2.2]octane in dipropylene glycol |
| 0.6 part by weight | dimethylaminopropylamine |
| 0.6 part by weight | a commercial crosslinker based on aliphatic polyamines (PU-Vernetzer 56, a product of Bayer AG) |
| 0.5 part by weight | B 5246 (Goldschmidt AG) |
| 3.0 parts by weight | polyether polyol (OH value 36) of Example 2 |

Example 2

B component:

Semiprepolymer of Example 1

100 parts by weight of the A component are mixed in a high-pressure machine with 93 parts by weight of the B component (NCO index 90). The other foaming conditions are as in Example 2. Mechanical testing of a foam specimen gives the following results:

| Test results: | | |
|---|---|---|
| Gross density (kg/m³) | DIN 52,420 | 39.4 |
| Compression hardness 40% (kPa) | DIN 53,577 | 5.31 |
| Tensile strength (kPa) | DIN 53,571 | 232 |
| Elongation at break (%) | DIN 53,571 | 137 |
| Compression set 50%, Ct value (%) | DIN 53,572 | 10.0 |

EXAMPLE 4

Preparation of flexible polyurethane foams A component

| | |
|---|---|
| 10 parts by weight | a dispersion (OH value 28) of an organic filler in a polyether polyol (OH value 35) that is obtained by propoxylation of trimethylolpropane and subsequent ethoxylation of the propoxylation product (ethylene oxide content 13%). The filler is a reaction product prepared in the polyether polyol of diisocyanatotoluene (80% 2,4- and 20% 2,6-isomer) with hydrazine hydrate in an NCO:NH₂ equivalent ratio of 1:1. |
| 90 parts by weight | a polyether polyol (OH value 35) prepared by propoxylation of trimethylolpropane and subsequent ethoxylation of the propoxylation product (ethylene oxide content 13%) |
| 3.2 parts by weight | water |
| 0.1 part by weight | bis(dimethylaminoethyl) ether |
| 0.3 part by weight | 33% solution of diazabicyclo[2.2.2]octane in dipropylene glycol |
| 0.5 part by weight | N,N-bis(dimethylaminopropyl)formamide |
| 1.0 part by weight | diethanolamine |
| 1.5 parts by weight | triethanolamine |
| 1.0 part by weight | a polyether polyol (OH value 100) prepared by propoxylation of sorbitol and subsequent ethoxylation of the propoxylation product (ethylene oxide content 80%) |
| 0.5 part by weight | a commercial polyether polysiloxane stabilizer (B 4113, a product of Goldschmidt AG) |

B-component

Semiprepolymer of Example 1

100 parts by weight of the A component are mixed in a high-pressure machine with 72.8 parts by weight of the B component (NCO index 100). The other foaming conditions are as in Example 2.

In another four parallel tests, the index was varied over the range from 80 to 120. The mechanical properties measured in each test are shown in the following:

| | Test results: | | | | |
|---|---|---|---|---|---|
| | 4a | 4b | 4c | 4d | 4e |
| NCO index | 100 | 110 | 120 | 90 | 80 |
| Gross density (kg/m³) DIN 53,420 | 48.7 | 50.7 | 52.0 | 53.4 | 53.7 |
| Compression hardness 40% (kPa) DIN 53,577 | 3.55 | 5.55 | 8.00 | 3.33 | 2.77 |
| Tensile strength (kPa) DIN 53,571 | 138 | 137 | 167 | 130 | 106 |
| Elongation at break (%) DIN 53,571 | 105 | 102 | 97 | 110 | 112 |
| Compression set 50%, Ct value (%) DIN 53,572 | 4.9 | 4.4 | 4.1 | 4.5 | 5.4 |

What is claimed is:

1. A urethane-modified polyisocyanate composition having an NCO content of about 15 to about 30% by weight that is liquid at room temperature, wherein said polyisocyanate composition is obtained by reaction of
   (a1) a polyisocyanate or polyisocyanate mixture of the diphenylmethane series containing from 50 to 100% by weight diisocyanatodiphenylmethane isomers,
with (b) a substoichiometric quantity of a polyether polyol composition, said composition being (i) a polyether polyol having a hydroxyl equivalent weight of about 500 to about 3000 and a hydroxyl functionality greater than about 4 or (ii) a mixture of two or more polyether polyols having an average hydroxyl equivalent weight of about 500 to about 3000 and an average hydroxyl functionality greater than about 4.

2. A polyisocyanate composition according to claim 1 wherein component (b) consists of at least one polyether polyol containing polymerized alkylene oxide units, said polymerized alkylene oxide units containing about 70 to about 100% by weight propylene oxide units and about 0 to about 30% by weight ethylene oxide units.

3. A polyisocyanate composition according to claim 2 wherein the ethylene oxide units are present in the polyether polyol in statistical distribution, as blocks incorporated within the chains, or terminally.

4. A polyisocyanate composition according to claim 1 wherein component (b) consists of at least one polyether polyol containing about 25% by weight based on the total weight of the polymerized alkylene oxide units, of terminal polymerized ethylene oxide units.

5. A polyisocyanate composition according to claim 1 wherein the diisocyanatodiphenylmethane isomers of component (a1) consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%.

6. A polyisocyanate composition according to claim 1 obtained by reaction of
(a1) a polyisocyanate or polyisocyanate mixture of the diphenylmethane series containing from 50 to 100% by weight diisocyanatodiphenylmethane isomers, wherein said diisocyanatodiphenylmethane isomers consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%,
with
(b) a substoichiometric quantity of at least one polyether polyol containing polymerized alkylene oxide units, said polymerized alkylene oxide units containing about 75 to about 95% by weight propylene oxide units and about 5 to about 25% by weight, based on the total weight of the polymerized alkylene oxide units, of terminal polymerized ethylene oxide units.

7. A urethane-modified polyisocyanate composition according to claim 1 having an NCO content of about 15 to about 30% by weight that is liquid at room temperature, wherein said polyisocyanate composition is obtained by reaction of
(a1) a polyisocyanate or polyisocyanate mixture of the diphenylmethane series containing from 50 to 100% by weight diisocyanatodiphenylmethane isomers,
with
(b) a substoichiometric quantity of a polyether polyol composition, said composition being (i) a polyether polyol having a hydroxyl equivalent weight of about 500 to about 3000 and a hydroxyl functionality greater than about 4 or (ii) a mixture of two or more polyether polyols having an average hydroxyl equivalent weight of about 500 to about 3000 and an average hydroxyl functionality greater than about 4,
followed by mixing the reaction product obtained by reaction of components (a1) and (b) with
(a2) a urethane-free polyisocyanate or polyisocyanate mixture of the diphenylmethane series containing from about 40 to about 100% by weight diisocyanatodiphenylmethane isomers,
with the proviso that the total content of diisocyanatodiphenylmethane isomers in components (a1) and (a2) is about 50 to about 95% by weight of the combined amounts of components (a1) and (a2) and the total content of polyisocyanates of the diphenylmethane series having functionality greater than 2 in components (a1) and (a2) is about 5 to about 50% by weight of the combined amounts of components (a1) and (a2).

8. A polyisocyanate composition according to claim 7 wherein component (b) consists of at least one polyether polyol containing polymerized alkylene oxide units, said polymerized alkylene oxide units containing about 70 to about 100% by weight propylene oxide units and about 0 to about 30% by weight ethylene oxide units.

9. A polyisocyanate composition according to claim 8 wherein the ethylene oxide units are present in the polyether polyol in statistical distribution, as blocks incorporated within the chains, or terminally.

10. A polyisocyanate composition according to claim 7 wherein component (b) consists of at least one polyether polyol containing about 5 to about 25% by weight, based on the total weight of the polymerized alkylene oxide units, of terminal polymerized ethylene oxide units.

11. A polyisocyanate composition according to claim 7 wherein the diisocyanatodiphenylmethane isomers of at least one of components (a1) or (a2) consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%, with the proviso that the total content of 2,4'-diisocyanatodiphenylmethane in components (a1) and (a2), based on the total content of diisocyanatodiphenylmethane isomers, is about 10 to about 40% by weight.

12. A polyisocyanate composition according to claim 7 obtained by reaction of
(a1) a polyisocyanate or polyisocyanate mixture of the diphenylmethane series containing from 50 to 100% by weight diisocyanatodiphenylmethane isomers with
(b) a substoichiometric quantity of at least one polyether polyol containing polymerized alkylene oxide units, said polymerized alkylene oxide units containing about 75 to about 95% by weight propylene oxide units and about 5 to about 25% by weight, based on the total weight of the polymerized alkylene oxide units, of terminal polymerized ethylene oxide units,
followed by mixing the reaction product obtained by reaction of components (a1) and (b) with
(a2) a urethane-free polyisocyanate or polyisocyanate mixture of the diphenylmethane series containing from about 40 to about 100% by weight diisocyanatodiphenylmethane isomers, with the provisos (i) that the total content of diisocyanatodiphenylmethane isomers in components (a1) and (a2) is about 50 to about 95% by weight of the combined amounts of components (a1) and (a2) and the total content of polyisocyanates of the diphenylmethane series having functionality greater than 2 in components (a1) and (a2) is about 5 to about 50% by weight of the combined amounts of components (a1) and (a2), (ii) that the diisocyanatodiphenylmethane isomers of at least one of components (a1) or (a2) consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%, and (iii) that the total content of 2,4'-diisocyanatodiphenylmethane in components (a1) and (a2), based on the total content of diisocyanatodiphenylmethane isomers, is about 10 to about 40% by weight.

13. A process for the preparation of a composition of claim 1 comprising reacting
(a1) a polyisocyanate or polyisocyanate mixture of the diphenylmethane series containing from 50 to 100% by weight diisocyanatodiphenylmethane isomers,
with
(b) a substoichiometric quantity of a polyether polyol composition, said composition being (i) a polyether polyol having a hydroxyl equivalent weight of about 500 to about 3000 and a hydroxyl functionality greater than about 4 or (ii) a mixture of two or more polyether polyols having an average hydroxyl equivalent weight of about 500 to about 3000 and an average hydroxyl functionality greater than about 4.

14. A process according to claim 13 wherein the polyether polyol composition of component (b) has an average hydroxyl functionality of about 4.5 to about 6 and consists of at least one polyether polyol containing polymerized alkylene oxide units, said polymerized alkylene oxide units containing about 70 to about 100% by weight propylene oxide units and about 0 to about 30% by weight ethylene oxide units.

15. A process according to claim 14 wherein the ethylene oxide units are present in the polyether polyol in statistical distribution, as blocks incorporated within the chains, or terminally.

16. A process according to claim 13 wherein component (b) consists of at least one polyether polyol containing about 5 to about 25% by weight, based on the total weight of the polymerized alkylene oxide units, of terminal polymerized ethylene oxide units.

17. A process according to claim 13 wherein the diisocyanatodiphenylmethane isomers of component (a1) consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%.

18. A process according to claim 13 comprising reacting
(a1) a polyisocyanate or polyisocyanate mixture of the diphenylmethane series containing from 50 to 100% by weight diisocyanatodiphenylmethane isomers, wherein said diisocyanatodiphenylmethane isomers consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%,
with
(b) a substoichiometric quantity of a polyether polyol composition having an average hydroxyl functionality of about 4.5 to about 6 and consisting of at least one polyether polyol containing polymerized alkylene oxide units, said polymerized alkylene oxide units containing about 75 to about 95% by weight propylene oxide units and about 5 to about 25% by weight, based on the total weight of the polymerized alkylene oxide units, of terminal polymerized ethylene oxide units.

19. A process for the preparation of a composition of claim 7 comprising reacting
(a1) a polyisocyanate or polyisocyanate mixture of the diphenylmethane series containing from 50 to 100% by weight diisocyanatodiphenylmethane isomers,
with
(b) a substoichiometric quantity of a polyether polyol composition, said composition being (i) a polyether polyol having a hydroxyl equivalent weight of about 500 to about 3000 and a hydroxyl functionality greater than about 4 or (ii) a mixture of two or more polyether polyols having an average hydroxyl equivalent weight of about 500 to about 3000 and an average hydroxyl functionality greater than about 4,
followed by mixing the reaction product obtained by reaction of components (a1) and (b) with
(a2) a urethane-free polyisocyanate or polyisocyanate mixture of the diphenylmethane series containing from about 40 to about 100% by weight diisocyanatodiphenylmethane isomers,
with the proviso that the total content of diisocyanatodiphenylmethane isomers in components (a1) and (a2) is about 50 to about 95% by weight of the combined amounts of components (a1) and (a2) and the total content of polyisocyanates of the diphenylmethane series having functionality greater than 2 in components (a1) and (a2) is about 5 to about 50% by weight of the combined amounts of components (a1) and (a2).

20. A process according to claim 19 wherein the polyether polyol composition of component (b) has an average hydroxyl functionality of about 4.5 to about 6 and consists of at least one polyether polyol containing polymerized alkylene oxide units, said polymerized alkylene oxide units containing about 70 to about 100% by weight propylene oxide units and about 0 to about 30% by weight ethylene oxide units.

21. A process according to claim 19 wherein the ethylene oxide units are present in the polyether polyol in statistical distribution, as blocks incorporated within the chains, or terminally.

22. A process according to claim 19 wherein component (b) consists of at least one polyether polyol containing about 5 to about 25% by weight, based on the total weight of the polymerized alkylene oxide units, of terminal polymerized ethylene oxide units.

23. A process according to claim 19 wherein the diisocyanatodiphenylmethane isomers of at least one of components (a1) or (a2) consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%, with the proviso that the total content of 2,4'-diisocyanatodiphenylmethane in components (a1) and (a2), based on the total content of diisocyanatodiphenylmethane isomers, is about 10 to about 40% by weight.

24. A process for the preparation of a composition of claim 7 comprising reacting (a1) a polyisocyanate or polyisocyanate mixture of the diphenylmethane series containing from 50 to 100% by weight diisocyanatodiphenylmethane isomers, with (b) a substoichiometric quantity of a polyether polyol composition having an average hydroxyl functionality of about 4.5 to about 6 and consisting of at least one polyether polyol containing polymerized alkylene oxide units, said polymerized alkylene oxide units containing about 75 to about 95% by weight propylene oxide units and about 5 to about 25% by weight, based on the total weight of the polymerized alkylene oxide units, of terminal polymerized ethylene oxide units.

followed by mixing the reaction product obtained by reaction of components (a1) and (b) with (a2) a urethane-free polyisocyanate or polyisocyanate mixture of the diphenylmethane series containing from about 40 to about 100% by weight diisocyanatodiphenylmethane isomers, with the provisos (i) that the total content of diisocyanatodiphenylmethane isomers in components (a1) and (a2) is about 50 to about 95% by weight of the combined amounts of components (a1) and (a2) and the total content of polyisocyanates of the diphenylmethane series having functionality greater than 2 in components (a1) and (a2) is about 5 to about 50% by weight of the combined amounts of components (a1) and (a2), (ii) that the diisocyanatodiphenylmethane isomers of at least one of components (a1) or (a2) consist of about 60 to about 90% by weight 4,4'-diisocyanatodiphenylmethane, about 10 to about 40% by weight 2,4'-diisocyanatodiphenylmethane, and about 0 to about 5% by weight 2,2'-diisocyanatodiphenylmethane, said percentages adding up to 100%, and (iii) that the total content of 2,4'-diisocyanatodiphenylmethane in components (a1) and (a2), based on the total content of diisocyanatodiphenylmethane isomers, is about 10 to about 40% by weight.

25. A method of using a polyisocyanate composition of claim 1 as an polyisocyanate component in the production of flexible polyurethane foams.

26. A method of using a polyisocyanate composition of claim 7 as an polyisocyanate component in the production of flexible polyurethane foams.

* * * * *